Nov. 17, 1953    W. McS. BREAZEALE    2,659,860
METHOD AND APPARATUS FOR MEASURING MOISTURE CONTENT
Filed Aug. 27, 1949
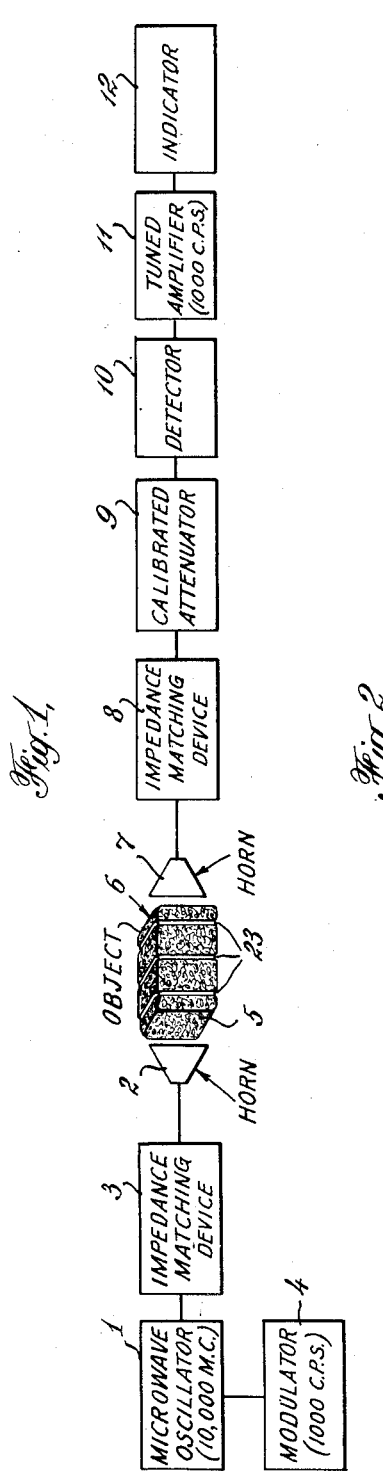
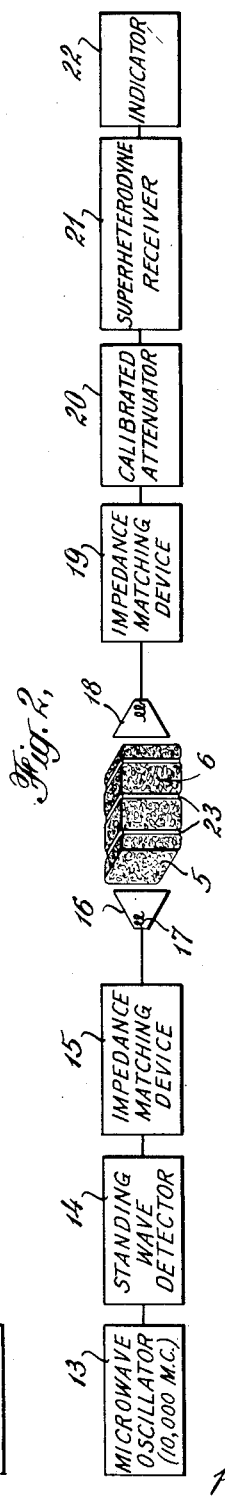
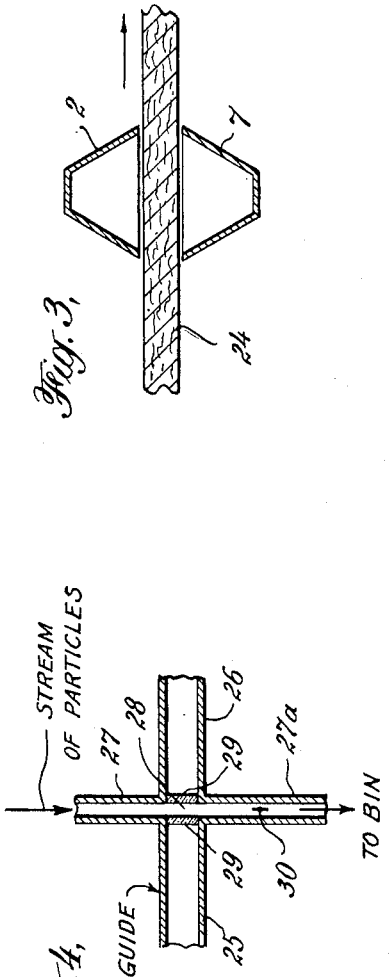
INVENTOR.
WILLIAM McSWAIN BREAZEALE
BY
Pennie, Edmonds, Morton & Barrows.
ATTORNEYS Patented Nov. 17, 1953

2,659,860

UNITED STATES PATENT OFFICE 2,659,860

METHOD AND APPARATUS FOR MEASURING MOISTURE CONTENT

William McSwain Breazeale, Charlottesville, Va., assignor to Institute of Textile Technology, Charlottesville, Va., a corporation of Virginia Application August 27, 1949, Serial No. 112,784

19 Claims. (Cl. 324—49)

1

This invention relates to the measurement of moisture content in materials, and comprises a method and means for determining the moisture content by measuring absorption by the moisture of electromagnetic microwaves. The invention is especially applicable, but not limited, to the measurement of moisture content of materials such as cotton and other fibrous substances.

The moisture content of various articles and materials has heretofore been measured or determined by a variety of methods and apparatus, some of which have been considered satisfactory under limited conditions of use. However, no method for measuring moisture content heretofore proposed has included the many advantages of the present invention. By means of the invention, the moisture content of any material may be measured, if, in its dry state, it absorbs electromagnetic microwave energy only to a small degree. In general, the size, shape and form of the material is of no consequence. Furthermore, measurements may be made on the material in its original form as distinguished from measurements on samples thereof, the material is not destroyed or damaged by the measuring procedure, the measurements may be made rapidly and with considerable accuracy, and they may be made, if desired, while the material or object is moving.

The nature of the invention will be understood from the following description considered together with the drawing, of which:

Fig. 1 is a block diagram of a simple embodiment of the invention suitable for measuring moisture content of various materials, a bale of cotton being illustrated;

Fig. 2 shows a modified form of the apparatus illustrated in Fig. 1, which employs circularly polarized waves and includes receiving apparatus of greater sensitivity;

Fig. 3 illustrates one manner in which the invention may be employed to measure the moisture content of a web or layer of material which may be moving, if desired; and Fig. 4 illustrates the application of the invention to the measurement of the moisture content of a stream of small particles.

The embodiment of the invention represented in Fig. 1 comprises a generator of electromagnetic microwaves including an oscillator 1 which is coupled to a radiating horn 2 through a suitable impedance matching device 3. For reasons mentioned below, the oscillator may, for example, be of 10,000 megacycles producing a 3-centimeter wave. If a simple detector and amplifier are employed, as illustrated in Fig. 1, the output of

2 the oscillator may be modulated at any convenient frequency. Modulator 4 shown connected to oscillator 1 may be assumed to be of 1,000 cycles per second.

The horn 2 should be designed for the frequency employed in a manner well known in the art, and in accordance with the invention should preferably have an area at the mouth somewhat less than the area of the effective surface against which the microwaves are caused to impinge. The type of horn shown in Fig. 1 transmits plane polarized radiation. The drawing is not to scale, for in the example illustrated the horn 2 might have a mouth area of say one-third that of the face 5 of the object 6 of which the moisture is being measured. In any event, the longest permissible wavelength is limited by the smallest lateral dimension of the object. The object 6 is here shown to comprise a bale of cotton, and taking this particular object by way of example, the aperture of the horn must be less than the lateral dimensions of the bale, but on the other hand the horn must be large enough to concentrate the energy into a beam which will not diverge outside the bale. The general relation is that the beam width is proportional to the wavelength and inversely proportional to the aperture. (See Barrow and Lewis, "The Sectoral Electromagnetic Horn," Proceedings of the Institute of Radio Engineers, vol. 27, pp. 41–51, 1939.) With a fixed horn aperture, the wavelength must be short enough to produce a beam of the required dimension. In the case of a bale of cotton, such as is here taken by way of example, a beam divergence of 5° to 10° generally speaking, is not excessive. Again, to reduce scattering, the horn should be located as close to the object as convenient, approximately 12 inches or less being suitable, in this case. The receiving or pickup horn 7 may be similar to the transmitting horn 2. Equivalent wave-emitting and receiving elements, for example parabolic reflectors, may be substituted for the horns, and hence the term "horn" is herein used in the generic sense of "antenna."

The remaining receiving apparatus may be coupled to horn 7 through a suitable impedance matching device 8. This apparatus includes a calibrated attenuator 9, a detector 10, an amplifier 11, and a suitable indicator 12. Suitable apparatus of the type here referred to is available on the market but has heretofore been used for specifically different purposes. Calibrated attenuators such as represented by reference character 9 are known in the art and have been employed in connection with microwave measurements. They are usually designated by the length of the wave they are designed to attenuate. In this case the attenuator would be of the 3-centimeter type. For use in connection with the present invention the attenuator may conveniently be calibrated to read directly in terms of per cent of moisture content for a given material, because the "insertion" loss of wave energy is a function of the amount of moisture in the path of the beam of electromagnetic waves. Detector 10 may comprise any suitable microwave detector, the crystal type being satisfactory if the signal strength is sufficient. Amplifier 11 is represented as being tuned to 1,000 cycles per second because modulator 4 is of that frequency.

Indicator 12 may comprise any suitable device for measuring the effective amplitude of the waves or the output of amplifier 11. An indicating meter, a cathode ray oscilloscope, or a continuously recording device such as a direct-indicating oscillograph may be used. The latter is especially applicable in connection with continuous measurements such as may be employed in connection with the arrangements of Fig. 3 and Fig. 4.

Where the material does not have perfectly uniform transmission properties, it is desirable that the energy should be distributed evenly over the aperture of the horns (2 and 7 of Fig. 1) so that a maximum cross section area of the bale is included in the beam. This can be accomplished by making the angle of flare small (i. e. the horn very long), but as a practical matter it is better to use a horn with reasonable flare angle (say 60°) and correct the phase of the wave front with a metal lens. Such lenses are described in an article by W. E. Koch, "Metal Lens Antennas," Proceedings of the Institute of Radio Engineers, vol. 34, pp. 828 to 836, 1946. A horn having a flare angle in the neighborhood of 60° has been used successfully in combination with such a metal lens. This arrangement insures uniform distribution of the energy of the electromagnetic wave in the plane of its electric vector. The energy distribution in the plane of the magnetic vector is sinusoidal, but can be improved by increasing the dimension of the aperture of the horn in the direction parallel to the magnetic vector and then blocking the side edge portions of the horn aperture with stops arranged perpendicular to the magnetic vector and made of any of the commercial materials which absorb microwaves. In this manner the energy distribution across the width of the emitted beam (the portion of the beam that passes between the stops) is confined to the region of the peak of the sinusoidal energy distribution curve, where such distribution is substantially uniform; and the portions of the beam, corresponding to the most steeply sloped portions of the energy distribution curve, where energy distribution varies most markedly, are cut off by the stops.

To make a measurement of moisture content in accordance with the invention, the material or object is placed between the horns 2, 7 so that the beam of microwaves passes from the transmitting horn 2, through the object from one side and into horn 7 from the opposite side. The necessary adjustments of the apparatus having been made to assure impedance matching, etc., indicator 12 may be read to ascertain the amplitude of the signal after the wave energy has been absorbed by the moisture in the material or object. By comparing this loss value with that of a similar dry material or object, the amount of moisture can be determined. Alternatively, and preferably, the gain of the receiver is held constant and the attenuator adjusted to give a predetermined constant response on the indicator, which response is the same as for a similar but dry material or object. The degree of attenuator adjustment will then be a measure of the moisture content.

The embodiment of Fig. 2 is essentially the same as that represented in Fig. 1 but is more sensitive due to the substitution of a narrow band superheterodyne receiver 21 for the wide band detector 10. The apparatus here represented includes an electromagnetic microwave oscillator 13 which, for example, may be of the 3-centimeter Klystron type, the output of which passes through a standing-wave detector 14 to an impedance matching device 15 which couples the preceding apparatus to the transmitting horn 16. The standing-wave detector 14 need not necessarily be connected as a permanent component of the system, but may be used when desired to permit adjustment of the impedance matching device to insure that the impedance of the horn is matched to the impedance of the wave guide feeding it so as to minimize the energy which is reflected back into the wave guide. The standing-wave detector will show when the standing wave ratio, viz., the ratio of the maximum potential to the minimum potential of the wave, is as near as possible to unity. Such a device may be utilized in connection with any of the transmitting or microwave generating equipment in accordance with this invention.

In this embodiment, horn 16 may be considered to be designed for circularly polarized waves, and for this reason a short helix 17 is represented in the horn. It may be assumed that this helix terminates a round wave guide feeding the horn. The advantages of circularly polarized waves are discussed hereinafter. It has been found that a horn having a mouth measuring approximately 21 inches across, shaped to produce a beam of microwaves approximately 10° wide between half-power points will provide satisfactory results when employed to measure moisture content of cotton bales having an end surface approximately 3 feet square.

Either type of radiator (plane polarized or circularly polarized) may be used with either of the arrangements of equipment shown in Figs. 1 and 2 but the distribution of energy across the apertures of the circularly polarized radiators (16, 18) is not readily susceptible to correction with metal lenses.

The wave detecting or receiving apparatus represented in the system of Fig. 2 is, as above mentioned, essentially the same as that of Fig. 1. Here a receiving horn 18 similar to horn 16 is employed, and a superheterodyne receiver 21 is used for greater sensitivity. It may be assumed that this receiver includes the necessary amplifier and oscillator stages to provide the required amplification and detection of the unmodulated output of oscillator 13. Impedance matching device 19 and calibrated attenuator 20 correspond to components 8 and 9 of Fig. 1 and indicator 22 may comprise any of the forms above referred to in connection with Fig. 1.

The embodiments of the invention illustrated in Fig. 1 and Fig. 2 are represented as used in connection with a single object, viz., a bale of cotton. Cotton bales are formed of layers of cotton fibers, the planes of these layers being substantially parallel and running longitudinally of the bales, and are bound with metal ties 23, as illustrated in the figures. In that case the bale is placed between the transmitting and receiving horns, a measurement, comprising one or more readings, is made and the bale is removed. It may be noted that in this instance the bale is oriented so that the beam passes through the bale along the planes of the layers from end to end, and inside of the metal ties 23 in order that the metal will have substantially no effect on the measurements.

The same apparatus is likewise adapted to the measurement of moisture content in articles or material continuously moving, which is obviously of considerable advantage in connection with continuous processes. Examples of other apparatus adapted to continuous measurements of moving material are illustrated in Figs. 3 and 4.

The arrangement of Fig. 3 illustrates one manner in which the apparatus of Fig. 1 (or Fig. 2) may be employed in measuring the moisture content of a moving layer 24 of material such as paper, cloth, or, more specifically, cotton in the form of picker lap. Here, horns 2 and 7 of the system of Fig. 1 are positioned on opposite sides of the moving web or lap, and a continuous record of the moisture content may be had by employing as indicator 12 (or 22) a continuous recorder such as the direct-indicating oscillograph previously mentioned. In this case a wavelength shorter than 3 centimeters, probably less than half that length, would be preferable.

Inasmuch as the invention has unlimited application, all possible uses cannot here be described. However, an additional specific application to a different class of materials will further exemplify the wide applicability of the invention. Heretofore moisture content of small particles, such as grain, has been measured by sampling techniques in which small quantities are selected from random points in a bulk mass, and the moisture measurement made of the samples taken separately, or mixed to obtain an average. It is now possible by means of the present invention to measure the moisture content of a stream of particles continuously as it moves through a conduit or chute. Apparatus suitable for this purpose is illustrated in Fig. 4.

Wave guide 25 (Fig. 4) may be assumed to be connected to microwave generating apparatus as above described. A second wave guide 26 which is disposed opposite the first, and is in effect a continuation thereof, is coupled to suitable receiving or detecting apparatus such as as above described. At an angle to the wave guides, preferably at 90°, a chute 27 leads to a chamber 28 formed at the crossing of the chute and the wave guides. This chamber is enclosed with respect to the wave guides by windows 29 which should be of material transparent to the electromagnetic waves. Celluloid and other more recently developed plastic materials are suitable. Leading from the chamber 28 is a chute 27a which conducts the measured material elsewhere as to a bin. The cross-sectional dimensions of the chute at chamber 28 should be small compared with the wavelength of the microwaves, to prevent escape of power through the chute. Thus, if other considerations dictate the use of a short wavelength, for example 3 centimeters, the chute preferably should be less than 1½ centimeters square. Such a chute may be employed as a bypass to a larger or main chute. In that case, though the method of the invention would be continuous, it would be a sampling method.

The apparatus of Fig. 4 may be employed in fundamentally the same manner as the apparatus previously described. In measuring moisture content of a mass of particles, it is likely that there will be less wave energy absorption in the material than in the case of a bale of cotton, for example. Consequently, in this case it may be desirable to utilize microwaves of a shorter wavelength in order to increase the order of magnitude of absorption. For example, a wave of 1.5 or even 1.25 centimeters might here be suitable. A discussion of the relation of the wavelength to other factors is given below.

In order to measure the moisture content of a stream of grain, for example, the grain is fed into the upper conduit 27 so that it passes through chamber 28. Obviously, succeeding measurements cannot be accurate unless the microwaves have passed through material of substantially the same thickness and density. Consequently it is important that chamber 28 be uniformly filled during each measurement, or continuously filled if the measurement be constant. This condition can be met by different expedients, one simple means being the provision of a suitable trap or valve 30 in lower chute 27a. Such a trap acts as a constriction in the chute by which the flow through the lower chute 27a is less than that through the upper chute 27. As a result, the stream of particles backs up, with assurance of filling the chamber 28. If the trap is adjustable, as by a rotatable valve 30, the constriction may be adjusted to suit the particular circumstances. Valve 30 may be rotated so as completely to close conduit 27a as a result of which the material in chamber 28 would be stationary.

Many articles, such as bobbins and cheeses of yarn, are too large or otherwise unsuited to be measured in bulk, as can grain for example, and yet they are so small as to present an effective surface area less than the area of the beam of microwaves employed in accordance with the invention. In such event the object may be placed within a cavity resonator which is coupled by a suitable wave guide to a microwave oscillator as before. In other words, such cavity resonator may replace the horn 16 of Fig. 2, for example. Wavelengths between, say, 1 and 3 centimeters are applicable for this purpose. In the previously described embodiments, the energy loss will increase with increase of moisture content of the article placed in the cavity. This loss can readily be measured by measuring the "Q" of the cavity which is an inverse measure of the power loss therein. As is well known, the "Q" for an L-C resonant circuit is the ratio of the reactive volt-amperes in either the inductance (L) or capacity (C) to the power dissipated (at resonance); and procedures for measuring it are known in the art of microwave techniques.

The following discussion and suggestions may be of assistance to those desiring to employ the method and apparatus of the invention:

The power of the microwave oscillator obviously should be sufficient to assure that the energy emerging from the material under measurement is sufficiently great satisfactorily to actuate the receiver in spite of the wave-energy absorption. A 200 milliwatt oscillator of the Klystron type which generates 3-centimeter waves has been found to provide a satisfactory signal at the indicator after having been attenuated by passing through a cotton bale 5 feet long (500 lbs.). Cotton bales of gin density show insertion losses from about 10 decibels for bone-dry cotton to about 70 decibels for about 15 per cent moisture. The power requirements will necessarily vary in measuring materials of different dimensions and having different properties.

The success of measurements of moisture content according to the method of the invention depends in part upon the selection of the proper wavelength of the microwaves. It has already been pointed out that the wavelength should be shorter than the length of the smallest lateral dimension of the surface of the material or object against which the microwaves impinge. This may be re-stated as a restriction of the transverse dimensions (or area) of the beam of microwaves to less than the corresponding dimensions of the surface. If some of the microwave energy does not pass through the material, so much of the energy will obviously not be subject to modification by absorption in the material. The effect of this leakage of radiation around the edge of the object is likely not only for that reason to introduce an error in the measurement, but may result in a more obscure error due to wave reflections, wave interference, or the like. Therefore, as a practical matter, it is preferable that the wavelength be a small fraction of the smallest dimension of the area on which the microwaves impinge. For example, a fraction of the order of one-tenth has been found suitable.

The other limit of wavelength, viz., the shortest wavelength which is useful under practical conditions, is related to the absorption coefficient of the material and to the length of the path followed by the microwaves through the material. The power loss is an exponential function of the absorption coefficient of the material and the length of path for a given wavelength. Expressed as a ratio of the output power ($P_{out}$) to the input power ($P_{in}$), $$\frac{P_{out}}{P_{in}} = e^{-kx}$$

where $k$ can be defined as an absorption coefficient for the material in question, $x$ the path length, and $e$ the base of the natural system of logarithms. With the aid of the relation, $$\text{Loss in decibels} = 10 \log_{10} \frac{P_{in}}{P_{out}}$$

we find that the total loss in db is numerically equal to $8.686kx$. At wavelengths far removed from a resonance point, the absorption coefficient $k$ is inversely proportional to the wavelength. Close to a resonance peak the absorption rises very much more rapidly than this. There is a resonance absorption peak for water vapor at 1.2 cm. wavelength, but this will be modified to some extent when the moisture is adsorbed on a solid such as cotton. It may be assumed, however, that in the region just above 1.2 cm. the absorption increases much more rapidly with decrease in wavelength than would be indicated by the inverse relation. In the range less than about 1.25 cm. complications arise from the absorption of oxygen gas which reaches a maximum at around 0.5 cm. It will be evident from the foregoing that the more sensitive the receiver, the smaller the energy which can be detected, and hence, other things being equal, the smaller the wavelength which can be employed, down to about 1.25 cm. For a receiver of any given sensitivity, therefore, the wavelength of the radiation must be sufficiently long so that absorption in the material is not too great to attenuate the received signal below the level which will satisfactorily actuate the receiver.

As a general rule, it may be stated that in practicing the invention in connection with any given material the optimum wavelength is such that the energy of absorption or insertion loss due to the moisture content should be of the same order of magnitude as, or greater than, that in the same material in dry form, provided the total absorption is not too great for convenient measurement. Since the aperture for a given beam width is directly proportional to the wavelength, this decrease in wavelength with the size of the object is consistent with the above-mentioned restriction of the lateral dimensions of the beam with respect to those of the object.

In connection with the drawing it was mentioned that anisotropy of the material to be measured is an important consideration. It appears that materials formed of layers exhibit different wave absorption characteristics in respect to plane polarized waves impinging on the material at angles between a plane parallel to the layers and a plane at right angles to the plane of the layers. If the electric vector of the waves is perpendicular to the plane of the layers, minimum absorption is attained, whereas maximum absorption is attained when the electric vector is parallel to the plane of layers. This difference in absorption might amount to 20 decibels or more in the case of a cotton bale, for example. Hence, it is usually desirable, and frequently necessary, that in employing plane polarized radiation the microwave generator including the wave-emitting element be correctly oriented with respect to the plane of the layers so as to effect minimum transmission loss due to the mentioned angular relation. To achieve the desired relation in connection with the measurement of layers of cotton fibers the planes of the layers should, as illustrated in Fig. 1, preferably be perpendicular to the direction of the electric vector in the emitting and receiving horns; or at least the plane of polarization of the microwaves should be so oriented with respect to the planes of such layers in the material that attenuation of said waves due to the presence of moisture in the material is satisfactorily measurable. In any case, care should be taken to keep the angular relation the same during any one measurement or series of related measurements.

On the other hand, if circularly polarized radiation be employed, the orientation of the layers around the longitudinal axis is not important, because the anisotropic effect is averaged out by the circular polarization. In this case, however, the transmission efficiency is reduced and as a result greater generator power or increased receiver sensitivity may be necessary. Circularly polarized waves can be considered as made up of two equal electric vectors displaced 90 degrees in space phase, as well as in time phase. Hence, a bale formed of layers, as is here the case, will transmit the components of both vectors which are normal to the layers. The sum of these two transmitted components is, as above indicated, independent of the orientation of the bale around the longitudinal axis (the horizontal axis in Figs. 1 and 2) and is numerically equal to one of the electric vectors.

When the cross-sectional size of the object is considerably larger than the cross-section of the beam of radiation transmitted by the horn, multiple horns may be used on the transmitting and receiving ends, provided these are fed by suitable wave guides to avoid complications from interference patterns. This may be done if the paths from each horn to the microwave generator are equal in length, or, if they differ from each other, by an integral number of wave-lengths.

It is sometimes desirable to take more than one reading or measurement in respect to a given object, especially if it be of fairly large dimensions such as a cotton bale. Seldom is moisture uniformly distributed throughout an object of considerable dimensions, so that if the actual moisture content of the entire object is to be ascertained, several measurements taken through different portions of the object can be averaged to provide a more accurate final measurement.

I claim:

1. The method of measuring the moisture content of layer-formed material which includes, impressing a beam of microwaves on an effective surface of said material so that said waves pass through said material, orienting the material so that the planes of the layers thereof are substantially parallel to the direction of propagation of said beam, restricting the transverse dimensions of said beam to less than the corresponding dimensions of said surface, detecting the waves which have passed through said material, and measuring the attenuation of the detected waves in passing through the material.

2. The method according to claim 1 which includes the steps of polarizing said microwaves before they pass through the material, and of measuring substantially only the components of the electric vectors of the polarized waves which are normal to said planes.

3. The method according to claim 2 which includes the step of circularly polarizing said microwaves before they pass through the material, whereby the wave absorption is substantially independent of anisotropy of said material.

4. The method of measuring moisture content of an object formed in substantially parallel layers which includes, generating a beam of electromagnetic microwaves, polarizing and orienting said waves so that the electric vector thereof is substantially at right angles to the planes of the layers, restricting the transverse dimensions of said beam so as to be le than the dimenions of a side of the object in a plane transverse to the direction of propagation of the beam, passing said beam through said layers from said side thereof, receiving said beam at the opposite side thereof, and measuring the attenuation of the waves in passing through said object.

5. The method of measuring moisture content of an object formed in substantially parallel layers which includes, generating a beam of electromagnetic microwaves, polarizing and orienting said waves so that the electric vector thereof is substantially at right angles to the planes of the layers, passing said beam through said layers from one side thereof, detecting said beam at the opposite side thereof, and measuring the amplitude of the detected waves.

6. The method of measuring the moisture content of fibrous material formed of anisotropic units which includes generating polarized electromagnetic microwaves, orienting the plane of polarization of said waves with respect to the anisotropy of said units such that wave absorption due to said anisotropy is minimized, restricting the spread of said waves transverse to the axis of propagation so as to be less than the corresponding dimensions of the effective surface on which said waves are impressed, passing said waves through said material from said surface, detecting said waves at the opposite effective surface of said material, and measuring the attenuation of the waves in passing through said material.

7. The method of measuring the moisture content of fibrous material formed of anisotropic units which includes generating polarized electromagnetic microwaves, orienting the plane of polarization of said waves with respect to the anisotropy of said units such that wave absorption due to said anisotropy is minimized, passing said waves through said material from one surface thereof, detecting said waves at the opposite effective surface of said material, and measuring the attenuation of the waves in passing through said material.

8. The method of measuring the moisture content of layered anisotropic material which includes generating circularly polarized electromagnetic microwaves which comprise two equal electric vectors displaced substantially 90 degrees in time phase and space phase, impressing said waves on an effective surface of said material so that a portion of the wave energy is absorbed by moisture in the material as the waves pass through the material, restricting the dimensions of said waves transverse to the axis of propagation so as to be less than the corresponding dimensions of said effective surface on which said waves are impressed, detecting the components of the electric vectors which are normal to the layers of the material at another effective surface of said material, amplifying the detected components of the waves, and measuring the amplitude of the amplified wave components.

9. The method of measuring moisture content according to claim 8, in which the step of measuring includes passing the detected components of the waves through an attenuator, adjusting the degree of attenuation thereof so that the amplitude of the detected wave potential is equal to a predetermined value, and measuring the degree of adjustment.

10. In a system for measuring moisture content of layer-formed anisotropic material, microwave generating means including a microwave oscillator and a polarized-wave-emitting element coupled thereto and adapted to be disposed in proximity to anisotropic material to be measured, said microwave generating means being proportioned and arranged so that the electric vector of the emitted waves is substantially at right angles to the plane of a layer of material.

11. A system according to claim 10 which includes, a wave-guide coupling said wave-transmitting horn to said oscillator, an impedance-matching device connected between said wave-transmitting horn and said wave guide, an impedance-matching device connected to the output of said wave-receiving horn, and a calibrated attenuator connected between said last-named impedance-matching device and said wave-detecting means.

12. A system according to claim 11, adapted to measure the moisture content of cotton bales and the like, in which said microwaves are of a wavelength of the order of three centimeters.

13. In a system for measuring moisture content of anisotropic material formed in substantially parallel layers, microwave generating means including a microwave oscillator, a microwave-emitting element coupled thereto and adapted to be disposed in proximity to a first surface of anisotropic material to be measured, said microwave-generating means being of a type which emits circularly polarized waves, a microwave-receiving element adapted to be disposed in proximity to a second surface of said material opposite to said first surface, means orienting the microwave emitting and receiving elements so that the axis of the microwaves passing therebetween is substantially parallel to the planes of the layers of material to be measured, whereby the wave absorption by moisture in the material to be measured is substantially independent of anisotropy of the material, and means for measuring the microwave absorption in the material.

14. The method of measuring moisture content of an object formed in substantially parallel layers which includes, generating a beam of electromagnetic microwaves, polarizing and orienting said waves so that a substantial component of an electric vector thereof is substantially normal to the planes of the layers, restricting the transverse dimensions of said beam so as to be less than the dimensions of a side of the object in a plane transverse to the direction of propagation of the beam, passing said beam through said layers from said side thereof, receiving said beam at the opposite side thereof, and measuring the attenuation of said normal components of the waves in passing through said object.

15. The method of measuring moisture content of an object formed in substantially parallel layers which includes, generating a beam of electromagnetic microwaves, polarizing and orienting said waves so that a substantial component of an electric vector thereof is normal to the planes of the layers, passing said beam through said layers from one side thereof, detecting said beam at the opposite side thereof, and measuring the amplitude of said normal component of the detected waves.

16. In a system for measuring moisture content of layer-formed anisotropic material, microwave generating means including a microwave oscillator and a polarized-wave-emitting element coupled thereto and adapted to be disposed in proximity to anisotropic material to be measured, said microwave generating means being proportioned and arranged so that an appreciable component of an electric vector of the emitted waves is substantially normal to the plane of a layer of material.

17. A system for measuring moisture content of material which includes, a microwave oscillator, a wave-emitting element coupled to the output of said oscillator comprising a microwave horn adapted to emit plane polarized waves, said horn being proportioned to confine the spread of the emitted waves to an area smaller than that of the surface on which the waves impinge, the aperture of said horn being longer in the direction of the magnetic vector of the emitted waves than in the direction of the electric vector thereof, stops of microwave-absorbing material disposed to plug the side edge portions of the horn aperture and arranged perpendicular to the magnetic vector of the emitted wave, a wave-receiving element spaced from said wave-emitting element so as to accommodate material to be measured therebetween, wave-detecting means connected to said wave-receiving element, and indicating means connected to be actuated in response to the output of said wave-detecting means.

18. A system according to claim 17, in which the wave-emitting element comprises a microwave horn of wide flare angle, and a beam-converging metal lens.

19. The method of measuring a given characteristic of a mass of anisotropic material, said mass being characterized in being isotropic to polarized electromagnetic microwaves along at least one plane through the mass, which includes the steps of generating polarized electromagnetic waves of such wavelength that a portion of the wave energy is selectively absorbed as a function of said characteristic, impressing said waves on an effective surface of said mass so that the axis of propagation of the waves is substantially parallel to said plane, confining the path of the microwaves substantially within the lateral boundaries of said mass, detecting at another surface of the mass the unabsorbed portion of an electric vector of said waves which is substantially normal to said plane, and measuring the detected portion and thus the attenuation of the waves in passing through said mass.

WILLIAM McSWAIN BREAZEALE.

References Cited in the file of this patent

UNITED STATES PATENTS

| Number | Name | Date |
| --- | --- | --- |
| 2,165,214 | Blau et al. | July 11, 1939 |
| 2,423,383 | Hershberger | July 1, 1947 |
| 2,457,695 | Liskow | Dec. 28, 1948 |
| 2,463,297 | Muskat et al. | Mar. 1, 1949 |
| 2,491,413 | Schlesman | Dec. 13, 1949 |
| 2,524,290 | Hershberger | Oct. 3, 1950 |
| 2,611,804 | Zaleski | Sept. 23, 1952 |

OTHER REFERENCES

Instruments, January 1947, page 6.